(12) United States Patent
Tripp

(10) Patent No.: US 6,371,148 B1
(45) Date of Patent: Apr. 16, 2002

(54) HOSE FEED AND RETRIEVAL SYSTEM RELATED APPLICATIONS

(75) Inventor: Gary R. Tripp, Corbin, KY (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 09/706,639

(22) Filed: Nov. 6, 2000

Related U.S. Application Data

(63) Continuation-in-part of application No. 09/282,409, filed on Mar. 31, 1999.

(51) Int. Cl.⁷ .................................................. F02B 27/00
(52) U.S. Cl. ......................... 137/15.01; 137/355.28; 137/355.2; 137/899; 242/390.8; 242/563.2; 242/563.4
(58) Field of Search .................. 137/355.16, 355.2, 137/355.28, 15.01; 251/129.04; 242/390.8, 563, 563.2, 563.4

(56) References Cited

U.S. PATENT DOCUMENTS

| | | | |
|---|---|---|---|
| 1,489,664 A | 4/1924 | Dowrelio | |
| 3,661,170 A | 5/1972 | Mitchell | 137/351 |
| 3,911,944 A | 10/1975 | Hukuba et al. | 137/355 |
| 3,958,297 A | 5/1976 | Hukuba et al. | 15/315 |
| 4,212,421 A | 7/1980 | Scott | 226/127 |
| 4,882,568 A * | 11/1989 | Kyser et al. | 340/568 |
| 5,023,959 A * | 6/1991 | Mercer | 4/321 |
| 5,558,118 A * | 9/1996 | Mooring | 137/342 |
| 5,653,262 A * | 8/1997 | Hanemaayer | 137/899 |
| 5,740,581 A * | 4/1998 | Harrelson, II | 15/314 |
| 5,947,148 A * | 9/1999 | DeVito | 137/355.26 |
| 6,182,327 B1 * | 2/2001 | Gosselin | 15/315 |
| 6,213,424 B1 * | 4/2001 | Helfer-Grand | 242/564.1 |

* cited by examiner

Primary Examiner—A. Michael Chambers
(74) Attorney, Agent, or Firm—Duane Morris LLP

(57) ABSTRACT

A hose extending and retrieval system and method used for loose-fill insulation operations that includes a hose member that is taken-up or fed-out from a hose storage container with a gear mechanism. A hose extending and retrieval system includes a hose member having a helical rib traversing therethrough, a hose storage container comprising an aperture forming a conduit, and a gear mechanism including a first gear and a second gear disposed on opposing sides of the hose member, wherein protrusions on the first and second gears interlock with the helical hose member. The gear mechanism interlocks with a helical component on the outside of the hose to provide sufficient operational impetus.

21 Claims, 3 Drawing Sheets

HOSE FEED AND RETRIEVAL SYSTEM

RELATED APPLICATIONS

RELATED APPLICATIONS

The present invention is a CIP of U.S. patent application Ser. No. 09/282,409.

BACKGROUND OF THE INVENTION

1. Field of the Invention

The present invention relates to hose extending and retrieving systems, and in particular, a hose extending and retrieving system for installing loose fill insulation. The extending and retrieving system of the present invention allows an operator to control the hose length while placing insulation into an area that is remote from the location of the loose fill source.

2. Brief Description of the Related Art

Loose fill insulation may be dispensed in a variety of ways. Generally, a hose is used to dispense the loose fill insulation. The operator positions a hose nozzle in a desired direction and dispenses the insulation from the loose fill source into the area at which the nozzle is aimed. Extending the hose from the source of loose fill into an area, such as an attic or basement, becomes problematic with the weight and configuration of the hose. The movement of the hose during the application process is generally cumbersome for the operator installing the insulation. Long lengths of hose are difficult to maneuver for an operator while being occupied with the task of installing the installation. Hoses resting on the ground also may create trip hazards or other problems. Forjobs requiring loose fill to be transported over long distances, control of the hose may require additional personnel for applying the loose fill insulation.

Several types of hose extending and retrieval devices have previously been disclosed. However, these previous systems suffer from various deficiencies which are described below.

U.S. Pat. No. 1,489,664 to Dowrelio discloses an automatic hose reel having a mesh gear to wind a hose 19 onto a drum 15. However, Dowrelio fails to disclose or suggest a gear system that engages a hose.

U.S. Pat. No. 3,661,170 to Mitchell discloses an air start system for airplanes with a flexible hose (formed of airlines 14, 16) that retracts and extends. Similarly to Dowrelio, the patent to Mitchell fails to teach or suggest a gear system that engages a hose.

U.S. Pat. No. 3,911,944 to Hukuba et al. discloses an apparatus for housing a hose 2 of a suction cleaner having a pair of rollers 5 and 5' that hold the hose therebetween that rotate in opposite directions. Each of the rollers 5, 5' is tapered toward the center, and each has a plurality of vertical grooves formed around the periphery thereof. Each roller may be selectively rotated both clockwise and counter-clockwise by means of a reversible motor. The rollers 5, 5' of Hukuba engage the exterior of the hose 2, and frictional forces (between the hose and the rollers) are used to move the hose. Hukuba fails to disclose or suggest a gear system which engages projections formed on the hose.

U.S. Pat. No. 3,958,297 to Hukuba et al. discloses a suction cleaner having a pair of rotating rollers 14 and 14' which are disposed above and below a hose 12 so as to hold it therebetween. The rollers are interlocked and one roller is so devised as to be selectively rotated both clockwise and counter-clockwise by means of a reversible motor. As with Hukuba '944, Hukuba '297 discloses rollers 14, 14' which engage and move a hose by frictional forces. Hukuba '297 also fails to disclose or suggest a gear system which engages projections formed on the hose.

U.S. Pat. No. 4,212,421 to Scott discloses a retrieving and storing apparatus for elongated flexible hoses with two wheels 40, 44 with peripheries having concave, generally semicircle annular groves with the bottoms of the grooves being serrated, knurled, axially grooved, or otherwise roughened to improve the grip on an elongated flexible element such as a water hose. As with the Hukuba patents discussed above, Scott uses frictional contact to extend or retrieve the hose.

U.S. Pat. No. 5,023,959 to Mercer discloses a system for extending and retracting a waste hose 12 from a recreational vehicle (RV). The system includes an external collar 20 that engages a continuous helical rib 22 formed around the outer periphery of the hose. An inner surface of the collar 20 engages the hose 12 so that rotation of the collar moves the hose. However, the rotating external collar 20 of Mercer generally provides a slow extension and retrieval of the hose, and may be easily jammed.

Due to the length, weight, and location of loose fill insulation hoses, frictional members that interact with the hose to move the hose are operationally inadequate for insulation hoses, as the frictional members would require excessive frictional forces to be functional. Additionally, systems such as the one taught by Mercer (U.S. Pat. No. 5,023,959) have proven too slow to accommodate the needs of the loose fill insulation dispensing industry.

Thus, there is currently a need for an improved system and method for facilitating the movement of the loose fill insulation hose between a loose fill source and an area of laying the loose fill insulation.

SUMMARY OF THE INVENTION

The present invention is a hose management system comprising a hose member having a helical rib traversing therethrough, a hose storage container comprising an aperture forming a conduit, wherein the hose member is capable of traversing through the conduit, and a gear mechanism including a first gear and a second gear disposed on opposing sides of the hose member, wherein protrusions on the first and second gears interlock with the helical hose member.

The above and other advantages and features of the present invention are better understood from the following detailed description of the preferred embodiments of the invention which is provided in connection with the accompanying drawings.

DETAILED DESCRIPTION OF THE PREFERRED EMBODIMENT

The present invention comprises a hose extending and retrieving system and method for operating the same.

In a conventional insulation dispensing apparatus, loose fill insulation is placed into a hopper or housing and conditioned, as described in U.S. patent application Ser. No.

Figure 3:
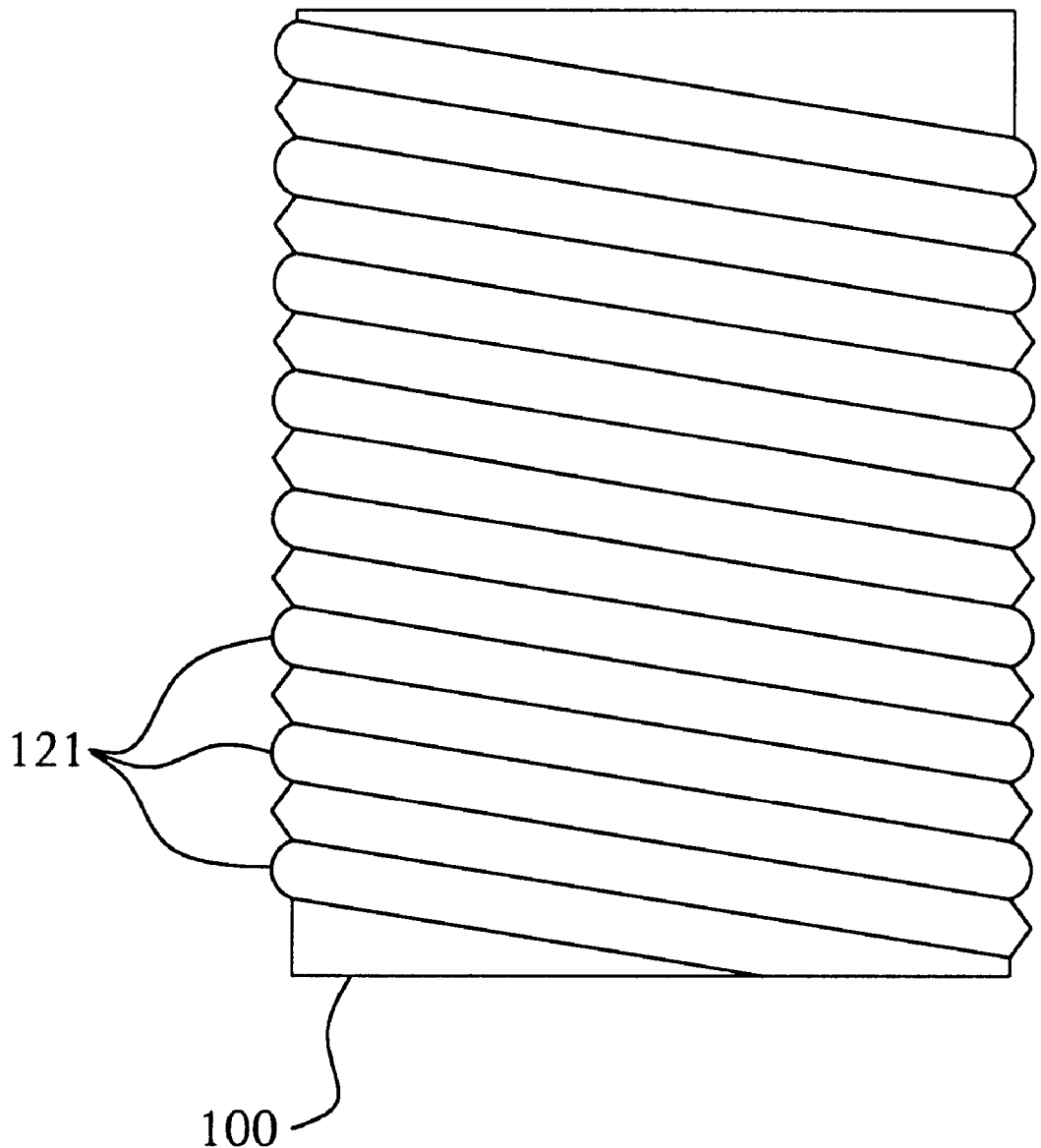
FIG. 3 illustrates a side elevation view of a hose according to an exemplary embodiment of the present invention.

09/282,409, filed Mar. 11, 1999, entitled "Improvement to Hose Used to install Loose Fill Insulation" by Kelley et al., the disclosure of which is herein incorporated by reference. The invention disclosed in the Kelley et al. Application is an improved hose or tube 100 for attachment to an insulation dispensing apparatus (See FIG. 3). In particular, and as shown in FIG. 3 of the present application, the hose 100 includes a helical rib 110 which traverses the length of the hose. Opposite the helical rib 110 on an interior surface of the hose 100 there is a projection (not shown) which also extends the length of the hose, and which serves to condition loose fill insulation as it passes through the tube. Insulation hoses, such as the type disclosed in the Kelley et al. Application, are often difficult to maneuver into and out of insulation dispensing apparatus or container. The present invention is directed to facilitating the easy movement of such insulation hoses.

Figure 1:
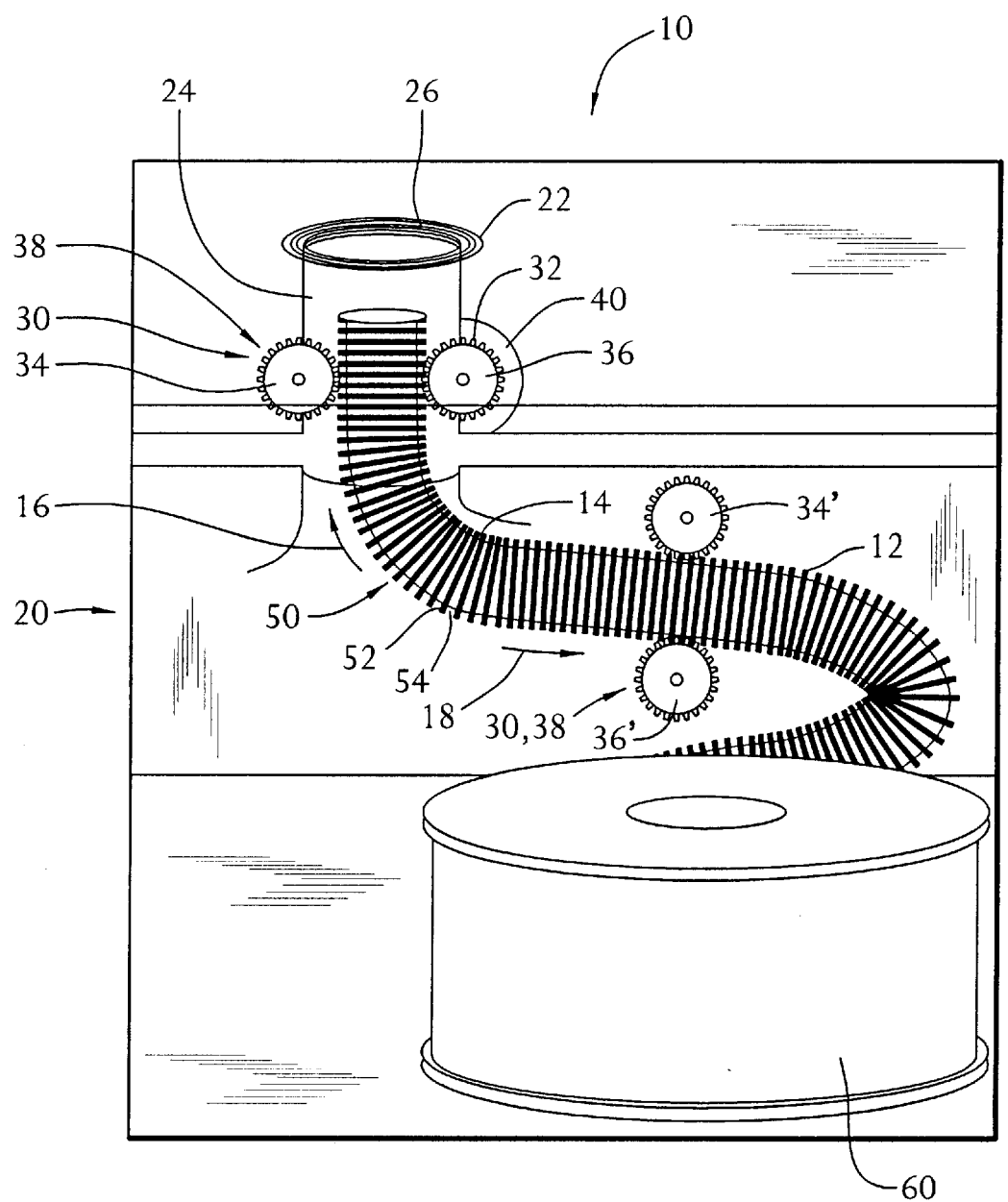
FIG. 1 illustrates a hose extending and retrieval system of the present invention; and, FIG. 2 illustrates a system for utilizing the hose extending and retrieval system shown in FIG. 1.

Referring to FIG. 1, a hose extending and retrieval system 10 according to a preferred embodiment of the present invention is shown. The hose extending and retrieval system 10 includes a hose member 12 that may be stored within a hose storage container 20. The hose member 12 may be paid-out or taken in by a gear mechanism 30 that is operationally positioned adjacent to an aperture 22, with the gear mechanism 30 impelled by a motor 40 that is attached to the gear mechanism 30. The gear mechanism 30 provides a planar impulse force to the hose member 12, causing the hose member 12 to move.

The planar impulse force provided by the gear mechanism 30 to the hose member 12 is in contrast to the frictional forces used in prior art hose extension and retrieval systems (e.g., the patents to Hukuba discussed above). It has been discovered by the present inventor that planar impulse forces are much more efficient in transferring force from the moving member (e.g., gear mechanism) to the hose.

Planar impulse force includes the use of surface areas to push or impel one object with respect to another. In the present invention, the surface area of the gear teeth 32 of the gear mechanism 30 contact portions (i.e. front and rear contact surfaces 52, 54, explained below) of the helical rib 14 of the hose member 12. As the force between the two surfaces (i.e., the helical rib surface and the gear teeth surface) is aligned perpendicular to the pressing surfaces, the planar force constitutes a substantial amount of non-frictional force. This surface-to-surface, or planar, connection allows the gear mechanism 30 to impel the hose member 12 in a forward 16, or rear 18, direction.

Raised portions of the helical rib 14 form a front contact surface 52 and a rear contact surface 54. As the surface area of the gear teeth 32 contact the surface area of either the front contact surface 52 or rear contact surface 54, the gear teeth 32 are able to impart a planar force perpendicular to the front and rear contact surfaces, respectively. Movement of the gear mechanism 30 in the forward direction 16 forces the hose member 12 out of the hose storage container 20, while movement in the rear direction 18 causes the hose member 12 into the hose storage container 20.

In the preferred embodiment, the hose member 12 has a helical rib 14 that traverses along the length of the hose member 12. The hose member 12 preferably is flexible, having a generally cylindrical circular cross-section, however, the hose member 12 may have a variety of cross-sectional shapes (e.g., oval, rectangular, polygonal), with the proper shape being determinable by those skilled in the art. Additionally, the hose member 12 may comprise an inner liner, or other known configurations. Preferably, the helical rib 14 traverses along the entire length of he hose member 12, but shorter operational lengths may be used. The hose member 12 may comprise any suitable length for placing insulation, preferably having lengths of from about 10 feet to about 300 feet, more preferably from about 50 feet to about 200 feet, and most preferably from about 100 feet to about 200 feet. The hose member 12 also may comprise any suitable diameter for placing insulation, preferably having a diameter of from about 2 inches to about 10 inches, more preferably from about 3 inches to about 8 inches, and most preferably from about 4 inches to about 7 inches.

As shown in FIG. 1, the hose storage container 20 has sufficient size to store the hose member 12 therein. The hose storage container 20 includes an aperture 22 that forms a conduit 24. The conduit 24 is sufficiently large and dimensioned to allow the hose member 12 to traverse through the aperture 22 while allowing a smooth, non-catching, edge 26. The smooth edge 26 ensures that the folds 14 of the hose member 12 do not become snared onto the edge 26 as the hose member 12 enters or leaves the confines of the hose storage container 20. Within the hose storage container 20, the hose member 12 may be compressed along the longitudinal axis (i.e., along the length of the hose member 12) to store a larger amount of hose into a smaller area internally within the hose storage container 20. Additionally, channels or paths 60 may be included within the hose storage container 20 to reliably compress the hose member 12 as it enters the hose storage container 20. Take-up reels and/or other collecting devices for creating channels or paths 60 may be used within the hose storage container 20, as appropriate.

The gear mechanism 30 includes at least a first set of gear heads 38 that comprises two or more gears 34 and 36. The first set of the gears heads 38 is operationally positioned adjacent to the aperture 22, allowing the gears 34 and 36 to engage the helical rib 14 along the length of the hose member 12. The gears 34 and 36 engage the helical rib 14 with a planar impulse force that forces the hose member 12 into and out of the hose storage container 20. Gear surfaces on the gears 34 and 36 contact lateral surface areas of the helical rib 14 of the hose member 12, as the gears 34 and 36 are rotated in opposite directions, to force the hose member 12 in the forward 16 or rear 18 longitudinal directions. The gears 34 and 36 may include flat, worm and/or other appropriate gears, with flat gears being preferred.

The two gears 34 and 36 are substantially equilaterally positioned around the circumference of the hose member 12. Additional gears 34' and 36' also may be included within the first set of gear heads 38, with the additional gears 34' and 36' operating in concert with gears 34 and 36 to engage the folds 14 on the hose member 12. The additional gears 34' and 36' may laterally displaced from the position of the gears 34 and 36 (i.e., contacting different diameters of the hose member 12 at a given moment in time), in an in-line configuration with the gears 34 and 36, or may be placed adjacent to the gears 34 and 36 (i.e., contacting the same diameter of the hose member 12 at a given moment in time). When a particular set of gear heads 38 includes greater than two gears, such as three or four gears, the configuration of the multiple gears generally is arranged in a substantially equilateral position around the circumference of the hose member 12. Preferably, the gears composing any particular set of gears are adjustable to accommodate various sizes of hose members 12. The gears may be removable and interchangeable to accommodate various sizes of hose members 12 having different spacings of the helical rib 14.

Figure 2:
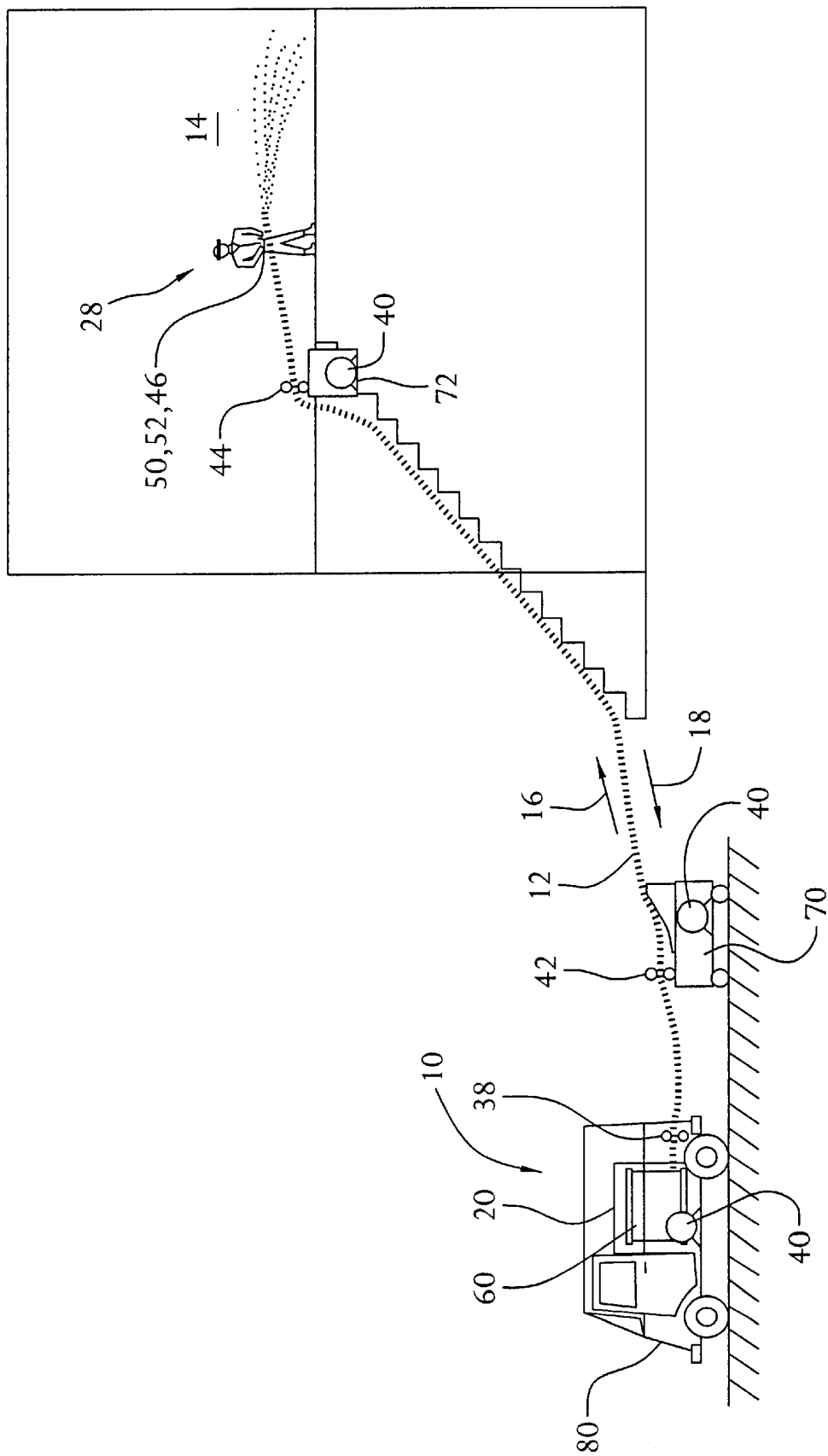

As seen in FIG. 2, the hose extending and retrieval system 10 may be mounted on a truck 80, or other like transporting device to carry the hose extending and retrieval system 10 to an operating location. Additional sets of gears 42 and 44 may be used to allow greater control of the hose member 12 as it is forced into and out of the hose storage container 20 on the truck 80, and maneuvered to properly position and dispense fill. With the first set of gears 38 located adjacent to the aperture 22, the second set of gears 42 may be contained within the hose storage container 20, preferably adjacent to the first set of gear heads 38. Thin allows smooth take-up of the hose member 12 into the hose storage container 20 as the hose member 12 is being fed into the hose storage container 20 with the first set of gear heads 38. With non-compressible hose members 12, the second set of gears 42 may aid in positioning the hose member within the hose storage container 20 to economize the storage space therein.

Additional sets of gears (i.e., the third, fourth, fifth, etc.) may be located either inside of the hose storage container 20 or outside. Preferably, regardless of whether the additional sets of gears are inside or outside of the hose storage container 20, the position and orientation of the additional sets of gears are fixed in relation to the hose storage container 20 to ensure that the hose member 12 does not become fouled as it is pushed and/or pulled by the first set of gear heads 38, with the proper positioning being determinable by those skilled in the art. In the preferred embodiment, the hose extending and retrieval system 10 comprises a plurality of additional sets of gears, outside of the hose storage container 20, and arranged along the path of the hose member 12, extending from the hose storage container 20 to the area of insulation placement, or fill area, 14. Each additional set of gears preferably has its own gear mechanism 30. The additional sets of gears 42 and 44 may be located on remote transport platforms 70 and 72 to guide the hose member 12 along the longitudinal length of the hose member 12 positioning. With the use of the additional sets of gears 42 and 44, significant control of the hose member 12 is obtained by a remote control operator 50 of the system. Although preferably the sets of gears 38, 42 and 44 act in unison to feed-out or take-in the hose member 12 in the forward 16 or rear 18 direction, the sets of gears 38, 42 and 44 more preferably are able to act individually in addition to being impelled jointly (i.e., as a group). Still more preferably, the set of gears 38,42 and 44 work in unison, while having the override or selection capability of an operator 28 causing one or more of the sets of gears 38, 42 and 44 to act independently, when desired. Most preferably, the first set of gears 38 is directly operated by the operator 28, with the second and additional sets of gears 42 and 44 under a slave operation of the first set of gears 38 (i.e., they operate in unison to the first set of gears 38, unless and until any of the second or additional sets of gears 42 and 44 individually register a specified amount of tension within the hose member 12, at which time that set, or sets, of gears 42 and 44 automatically disengages from acting in unison with the other sets of gears, particularly the first set of gears 38).

The remote transport platforms 70 and 72 are generally light weight structures, preferably having wheels to aid in locating the remote transport platforms 70 and 72 to a location. The remote transport platforms 70 and 72 are fixed in place to guide the hose member 12 longitudinally into and out of the fill area 114. Sensors along the hose member 12 may be used to allow the remote transport platforms 70 and 72 to indicate to the operator the tension of the hose member 12 at any particular remote transport platform 70 and 72. The remote transport platforms 70 and 72 are configured to secure to common fixed structures normally encountered in fill operations, such as adapting to stairs, halls, doorway, entry way, window, etc., with the proper configuration of the remote transport platform 70 and 72 determinable by those skilled in the art to best fix the position of the remote transport platforms 70 and 72. Preferably, each remote transport platform 70 and 72 possesses its own motor 40 for impelling the hose member 12.

The motor 40 attached to the gear mechanism 30 possesses sufficient power to rotate the gears 34 and 36 in a given direction to feed-out and/or take-in the hose member 12. This may be accomplished by having a drive member of the motor 40 operate in at least two different directions, or using a coupler to change the direction of the imparted motion from the motor 40 onto the gears 34 and 36. Any suitable power source for the motor 40 may be used, with an electric motor 40 being preferred.

The hose extending and retrieval system 10 may include a remote control operator or activating device 50 that activates the motor 40 from a remote location, such as the fill area 114. Preferably the activating device 50 includes a portable activating device 52. Suitable activating devices 50 include activating devices 50 that may be attached and carried on a belt, placed on a wrist or waist band, incorporated into the nozzle section of the hose member 12, stand-up control consoles placed within the fill area 114, or other like devices 50 that facilitate operation of the in-take and out-lay of the hose member 12 while placing insulation. The activating device 50 preferably comprises a read-out for indicating the length of extended hose 12 and/or other like information for monitoring the operation of the hose member 12 movement.

Additionally, the hole extending and retrieval system 10 may include a status indicator, such as an alarm, 46 that indicates problems within the hose extending and retrieval system 10 while the operator 28 operates the hose extending and retrieval system 10. This status indicator 46 for the hose extending and retrieval system 10 allows the operator 28 to become cognizant of dangerous conditions while remotely operating the hose extending and retrieval system 10. The alarm 46 may include an automatic cutoff, or other like safety mechanisms, to ensure that the hose extending and retrieval system 10 does not present an unsafe or hazardous condition.

In operation, the hose extending and retrieval system 10 is transported by truck 80 to a house or other building having the fill area 114 to lay fill. The fill may be located in a container adjacent to the hose storage container 20 in on the same truck 80, or transported on a separate truck. Once at the fill location, the hose member 12 is extended from the hose storage container 20 to the fill area 114 to receive the fill. The remote transport platforms 70 and 72 are located along the length of the hose member 12 between the truck 80 and the fill area 114, generally in a "line-of-sight" configuration, allowing each set of gears to be aligned with one or more of the other sets of gears. The location of the sets of gears is generally fixed from the first set of gear heads 38, with the second set of gears 42 located in a non-obstructed position from the first set of gear heads 38, and the third set of gears 44 located in a non-obstructed position from the second set of gears 42, etc. As the operator 28 positions each set of gears 38, 42 and 44, the operator 28 uses the portable activating device 52 to feed out the hose member 12 from the hose storage container 20 to connect the hose member 12 with the remote transport platforms 70 and 72. With the hose member 12 extended, the operator 28 activates the motor 40 to further extend the hose member 12 to the fill area 114, and once positioned, the operator 28 begins placing fill. The operator 28 may activate the fill process by actuation of a pump to pump fill through the hose member 12 and into the fill area 114, or alternatively, the operator 28 may charge the hose member 12 and use a release valve at the nozzle to flow fill into the fill area 114.

The following is a prophetic example of the operation of the present invention:

EXAMPLE 1

The leading edge of a 200 foot loose fill hose (e.g. hose 12 described above), that is attached to a blowing unit including extending and retrieval mechanism (e.g., system 10 described above) is mounted on a truck. When the hose feed switch is engaged, the hose is fed through the gears and out of the truck. Preferably, an additional set of gears (e.g., gears 42; FIG. 2) is located close to the truck, and leading to the attic area to be insulated. The leading end of the hose is threaded through the second set of gears and up into the attic. The gears, guarded to prevent injury, are AC powered and activated by remote control. The remote device is located on the operator's belt. When hose is required, in or out of the attic, the remote control conveniently moves the hose to keep it out from under the operator's feet. When the job is complete, the hose feed is reversed an the hose automatically feeds back into the truck.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A method for extending and retrieving a hose comprising:
    providing a hose member having a helical rib traversing therethrough, a hose storage container comprising an aperture forming a conduit, wherein the hose member is capable of traversing through the conduit, a gear mechanism operationally positioned adjacent to the apertures the gear mechanism including a first gear and a second gear disposed on opposing sides of the hose member and including a third gear and a fourth gear disposed on opposing sides of the hose member, wherein protrusions on the first, second, third and fourth gears interlock with the helical hose member, and a motor attached to the gear mechanism capable of rotating the first, second, third and further gears to move the hose through the conduit; and,
    activating the motor to extend and retrieve the hose member.

2. A hose management system comprising:
    a hose member having a helical rib traversing therethrough;
    a hose storage container comprising an aperture forming a conduit, wherein the hose member is capable of traversing through the conduit; and,
    a gear mechanism including a first gear and a second gear disposed on opposing sides of the hose member, wherein protusions on the first and second gears interlock with the helical hose member,
        wherein the gear mechanism further comprises third and fourth gears disposed on opposing sides of the hose member, wherein protrusions on the third and fourth gears interlock with the helical hose member.

3. The hose system of claim 2, further comprising:
    a motor attached to the gear mechanism capable of rotating the first and second gears to move the hose through the conduit.

4. The hose system of claim 2, wherein the gear mechanism is positioned adjacent to the aperture.

5. The hose system of claim 2, wherein the first and second gears comprise flat gears.

6. The hose system of claim 2, wherein the first and second gears comprise flat gears.

7. The hose system of claim 2, wherein the first and second gears are equilaterally positioned around the circumference of the hose.

8. The hose system of claim 2, wherein the gear mechanism further comprises at least one third gear.

9. The hose system of claim 2, wherein the first and second &ears are adjustable to accommodate various sizes of hoses.

10. The hose system of claim 2, wherein the gear mechanism further comprises fifth and sixth gears disposed on opposing sides of the hose member, wherein protrusions on the fifth and sixth gears interlock with the helical hose member.

11. The hose system of claim 2, wherein the first and second gears are removable and interchangeable.

12. The hose system of claims 2, wherein the motor comprises an electric motor.

13. The hose system of claim 2, further comprising:
    a portable activating device capable of activating the motor for a remote location.

14. The hose system of claim 13, wherein the portable activating device is capable of being attached and carried on an operator's belt.

15. The hose system of claim 2, wherein the hose has a diameter in a range from about 3 inches to about 8 inches.

16. The hose system of claim 2, wherein the hose is capable of longitudinal compression and extension along the helical rib.

17. A hose management system comprising:
    a hose member having a helical rib traversing therethrough;
    a hose storage container comprising an aperture forming a conduit, wherein the hose member is capable of traversing through the conduit;
    a gear mechanism including a first gear and a second gear disposed on opposing sides of the hose member, wherein protrusions on the first and second gears interlock with the helical hose member;
    a motor attached to the gear mechanism capable of rotating the first and second gears to move the hose through the conduit; and,
    a portable activating device capable of activating the motor for a remote location,
        wherein the portable activating device includes a display for indicating the approximate length of extended hose.

18. The hose system of claim 17,
    wherein the portable activating device also comprises an alarm for indicating the status of the hose system.

19. A loose-fill insulation system comprising:
    at least one hose member having a helical rib traversing therethrough;
    at least one hose storage container comprising an aperture forming a conduit, wherein the hose member is capable of traversing through the conduit; and,
    at least one gear mechanism including a first gear and a second gear disposed on opposing sides of the hose member, wherein protusions on the first and second gears interlock with the helical hose member, and wherein the at least one gear mechanism further comprises third and fourth gears disposed on opposing sides of the hose member, wherein protrusions on the third and fourth gears interlock with the helical hose member.

20. The loose-fill insulation system of claim 19, further comprising:
   a motor attached to the gear mechanism capable of rotating the first and second gears to move the hose tough the conduit.

21. The loose-fill insulation system of claim 19, wherein the gear mechanism is operationally positioned adjacent to the aperture.

* * * * *